(12) United States Patent
Davis et al.

(10) Patent No.: US 6,878,279 B2
(45) Date of Patent: Apr. 12, 2005

(54) METHOD FOR IN-SITU MICROBIAL SEEDING

(75) Inventors: Tommy Mack Davis, Spartanburg, SC (US); Cecil Allen McEntire, Spartanburg, SC (US); John Randolph Ayers, Spartanburg, SC (US); Caroline Ann Metosh-Dickey, Baton Rouge, LA (US)

(73) Assignee: TMD, L.L.C., Lafayette, LA (US)

( * ) Notice: Subject to any disclaimer, the term of this patent is extended or adjusted under 35 U.S.C. 154(b) by 205 days.

(21) Appl. No.: 10/086,784

(22) Filed: Feb. 28, 2002

(65) Prior Publication Data

US 2003/0159989 A1 Aug. 28, 2003

(51) Int. Cl.⁷ .................................................. C02F 3/00
(52) U.S. Cl. ........................ 210/610; 210/615; 210/620
(58) Field of Search ................................ 210/615, 616, 210/617, 620, 629, 610, 242.2

(56) References Cited

U.S. PATENT DOCUMENTS

| | | | |
|---|---|---|---|
| 3,998,714 A | * | 12/1976 | Armstrong .................. 210/752 |
| 4,286,061 A | | 8/1981 | Messing et al. |
| 4,670,149 A | | 6/1987 | Francis |
| 4,810,385 A | * | 3/1989 | Hater et al. ................. 210/606 |
| 4,925,564 A | | 5/1990 | Francis |
| 4,994,391 A | | 2/1991 | Hoffmann |
| 5,171,687 A | | 12/1992 | Moller et al. |
| 5,314,620 A | | 5/1994 | Staniec |
| 5,443,985 A | | 8/1995 | Lu et al. |
| 5,507,950 A | * | 4/1996 | Senda et al. ................. 210/615 |
| 5,516,687 A | | 5/1996 | Perez et al. |
| 5,628,364 A | | 5/1997 | Trenz |
| 5,770,079 A | * | 6/1998 | Haase ........................ 210/606 |
| 5,879,932 A | | 3/1999 | Erdewyk et al. |
| 5,911,877 A | | 6/1999 | Perez et al. |
| 5,935,843 A | | 8/1999 | Glendening et al. |
| 5,952,188 A | | 9/1999 | Kumar et al. |
| 6,087,155 A | | 7/2000 | York et al. |
| 6,207,047 B1 | | 3/2001 | Gothreaux |
| 6,207,056 B1 | | 3/2001 | Lucido et al. |
| 6,245,552 B1 | | 6/2001 | Glendening et al. |
| 6,248,234 B1 | | 6/2001 | Cline |
| 6,335,191 B1 | | 1/2002 | Kiplinger et al. |
| 2002/0070162 A1 | | 6/2002 | Fife et al. |
| 2003/0136734 A1 | * | 7/2003 | Mirzayi et al. ............. 210/610 |

* cited by examiner

Primary Examiner—Chester T. Barry
(74) Attorney, Agent, or Firm—Ted M. Anthony

(57) ABSTRACT

A method and apparatus is provided for the continuous microbial remediation of organic wastes in sewers and other waste-laden environments utilizing in-situ microbial seeding. A bio-reactor containing inoculated carrier media is suspended within a sewer wet-well or other similar environment, and is at least partially immersed in the waste-laden fluid to be treated. Air and nutrients are continuously supplied to the bio-reactor via conduit from a remote, easily accessible location. Beneficial microbial populations are permitted to thrive and spread throughout the waste-laden environment, mineralizing organic wastes and eventually becoming dominant within the subject environment.

14 Claims, 4 Drawing Sheets

METHOD FOR IN-SITU MICROBIAL SEEDING

BACKGROUND OF THE INVENTION

1. Field of the Invention

The present invention pertains to a method and apparatus for the treatment of organic wastes and other materials in sewers and other waste-laden environments. More particularly, the present invention pertains to a method and apparatus for continuous in-situ microbial seeding in sewers and other waste-laden environments for treatment of organic wastes and other similar materials.

2. Description of the Related Art

Water treatment facilities in general, and sewer systems in particular, are frequently confronted with a number of different problems. One especially prevalent problem is the emission of unpleasant odors. Such odors, which can frequently spread to surrounding areas, can emanate from a number of different sources. While these odors often come directly from waste materials contained within sewers and other facilities, unpleasant odors are also frequently caused by toxic and/or malodorous substances such as hydrogen sulfide which are produced when anaerobic, sulfide-producing microbial populations are allowed to flourish within a particular environment. Odor emission can be particularly problematic when a sewer or other facility in question is located in or near an inhabited area.

In addition to odor emissions, another problem facing sewer systems and water treatment facilities is corrosion. In many cases, such corrosion can be caused by unwanted microbial populations. For example, hydrogen sulfide and other microbial byproducts can be extremely corrosive and damaging to pipes, drains, basins and other components of sewer systems and/or water treatment facilities. Further, because such equipment is frequently located underground, it can often be very expensive, difficult and time consuming to replace.

Yet another problem routinely faced by sewer systems and other water treatment facilities is the handling of grease, oil and similar organic matter. Devices known as "grease traps" are required on virtually all commercial facilities that discard liquid or solid grease into sewer systems. Nonetheless, grease, oil and other related organic materials inevitably still find their way into sewer systems and, eventually, water treatment plants. Grease, oil and related substances can plug pipes and other equipment. When this occurs, maintenance crews most often pump out the blockage or, in extreme cases, dig up the pipes and/or other equipment in order to physically remove the obstructions. Moreover, present sewer and/or water treatment facilities are frequently unable to process increased volumes of organic matter without significant capital investment in new equipment.

In many conventional sewer systems, wet-wells are frequently utilized to transport the sewage to a higher elevation. These wet well locations act as a collection point for grease, oils and other organic matter that is not decomposed within the water flow. As a result, it is a common necessity to clean out the wet wells at pumping stations or other junction points in the system where floating grease and organic matter collects, hardens and remains until it is physically removed. Sewer lines with low flow rates, bends, and/or changes in elevation are also prone to build up of organic deposits.

Throughout the specification and claims reference is made to "treatment of wastes in sewers and other facilities". This phrase and other similar terminology, is intended to be broad and to include sewage collection systems, as well as other similar environments. For example, this invention is effective in sewer wet wells. However, the invention is also effective in other applications such as grease traps which are purposely maintained in a parallel relationship to standard waste water collection systems.

It is well known that certain microbes can be used in the prevention and/or treatment of the aforementioned problems. Such microbes can naturally mineralize or break down organic matter into harmless elements, such as carbon dioxide and water. As such, it has been found that certain microbes can be used to beneficially control or eliminate malodorous and/or toxic effluents in sewer wet-wells and other treatment facilities. Microbes can also be used to mineralize grease, oil and similar organic substances in such environments.

A common approach to microbial treatment of wastes in sewers and other facilities has been the use of "dosing stations" wherein one or more desired microbial populations are grown, and then subsequently added to the specific environment to be treated. Such microbial populations are added to the environment to be treated in periodic doses. In some cases, the microbial populations are grown at remote locations and then transported to the sewer or other facility to be treated. In other instances, microbial populations are grown near the sewer or other facility to be treated and then added to such sewer or other facility.

Unfortunately, periodic dosing of microbial agents for the treatment of wastes in sewers and other facilities has yielded results which are less than satisfactory. Competition for resources, lack of nutrients and natural enemies can combine to inhibit rapid growth of beneficial microbial agents. Thus, unless proper growth and delivery of microbial agents is employed, the beneficial microbes will not be effective where the breakdown of organic materials is desired. Put another way, simply dumping microbes into a particular environment to be treated seldom provides the desired results.

One major limitation associated with the periodic dosing of microbial populations for waste remediation purposes is the fact that there is no way to continuously monitor and/or control the amount of microbes to be added to a particular environment being treated. As a result, microbes must be added on an essentially arbitrary schedule, without regard for the specific amount of microbial population required to optimize the waste remediation process. Accordingly, there is no way to determine whether microbial agents have been fully spent and, therefore, whether additional microbes are needed to optimize waste treatment benefits.

The limitations associated with periodic dosing or addition of microbial populations to waste-laden environments become very apparent in the case of system "upsets." Such upsets occur when unexpected slugs of concentrated wastes or highly toxic substances are introduced into an environment which is being treated with microbial agents. In such instances, beneficial microbial populations can frequently become overwhelmed, and the mineralization process essentially stalls. When this occurs, the waste remediation process essentially shuts down. Moreover, the waste treatment process cannot begin again until a new and sufficiently robust dose of beneficial microbes is added to the waste stream.

A number of patents describe methods and devices for using microbes to treat organic wastes in sewers and other similar environments. Several of these patents disclose inventions which use containers that can be immersed or submerged directly into the waste-laden environments to be treated. Examples of such patents include U.S. Pat. No. 4,670,149 to Francis; U.S. Pat. No. 4,810,385 to Hater, et al.; U.S. Pat. No. 4,925,564 to Francis; U.S. Pat. No. 5,516,687 to Perez, et al., U.S. Pat. No. 5,911,877 to Perez, et al.; U.S. Pat. No. 5,879,932 to Van Erdewyk, et al.; U.S. Pat. No. 5,935,843 to Glendening, et al.; and U.S. Pat. No. 6,248,234 to Cline. However, unlike the invention described herein, the devices described in the aforementioned patents still require periodic addition (i.e., "dosing") of microbial cultures into the environment to be treated.

U.S. Pat. No. 5,314,620 to Staniec describes a method and apparatus for the use of microbes to purify cutting oil, such as used in metal machining equipment. The '620 patent describes means for aerating such cutting oil to encourage growth of aerobic bacteria, and to discourage the growth of unwanted anaerobic bacteria.

However, the method and apparatus described in the '620 patent do not provide for direct aeration of the beneficial microbial populations, or the addition of nutrients directly to said microbial populations. Furthermore, because cutting oil is kept in a relatively small reservoir, the method and apparatus described in the '620 patent does not promote beneficial microbial spreading throughout larger environments.

U.S. Pat. No. 4,994,391 discloses a system utilized to produce active bacteria to breakdown chemical or biological wastes in waste water effluents. The system described in the '391 patent utilizes a combination of a culturing basin and an acclimator basin in a temperature controlled space. The culturing basin contains numerous components, such as a series of removable nutrient suspension means and a vertical collection pipe with holes. The bacteria are cultured in the presence of the nutrient suspension means as bacteria are pumped out of one or two of these culturing basins into the acclimator basin. The system disclosed in the '391 patent is significantly more complicated and expensive to use than the present invention.

Thus, there is a need for an inexpensive way to continuously add desired microbial populations to sewers and other similar environments so that such microbial populations can beneficially attack organic materials for waste remediation purposes, is yet avoiding limitations associated with simple dosing of microbial agents. Further, the system used to continuously add such microbial populations should be able to handle unexpected or periodic slugs of concentrated wastes or other highly toxic substances without experiencing a system upset or other prolonged treatment disruption.

SUMMARY OF THE INVENTION

The present invention provides a method and apparatus for continuous, in-situ microbial seeding of waste-laden environments. By continuously adding a desired microbial population directly into such an environment to be treated, the present invention allows for demand growth and microbial acclimation based on waste content within said environment. Further, the present invention facilitates greater distribution of microbes throughout an environment being treated.

The present invention represents an improvement in the overall performance of existing microbial treatment systems. Because the microbial agents generated by the present invention are provided with a continuous supply of oxygen and/or nutrients, such microbial agents can more effectively mineralize waste within an environment being treated. The present invention is significantly less expensive than current microbial dosing systems used for waste remediation purposes.

The present invention comprises an immersible container which serves as a bio-reactor. Although such bio-reactor can be in any number of different configurations, in the preferred embodiment said immersible bio-reactor is a roughly cylindrical hollow container having a base. Said bio-reactor contains one or more apertures which permit communication between the internal and external surfaces of said bio-reactor. In the preferred embodiment, said apertures are in the form of a plurality of perforations extending through the walls of said hollow cylindrical container. Alternatively, the walls of said bio-reactor container can be formed of mesh or other porous material. Additionally, a removable cap is also provided to enclose the opening at the upper extent of said cylindrical bio-reactor container.

A conduit is provided which extends from the outside of said hollow cylindrical bio-reactor through to the inner bore or chamber thereof. In the preferred embodiment, said conduit is constructed of inert piping or tubing. Within the inner bore or chamber of said cylindrical bio-reactor, such conduit extends from the upper portion of said cylindrical bio-reactor to the base of said bio-reactor. Said conduit extends from a distance along the base of said cylindrical bio-reactor, and thereafter turns upward in the direction which is substantially parallel to longitudinal axis of said bio-reactor. One or more apertures or other openings extend through said conduit at or near the lower terminus thereof. Such conduit can be formed from tubing which is commercially available in varying rigidity, diameters and lengths. Generally, the rigidity, diameter and length of the conduit will be dictated by the specific air supply used and its proximity to the fluid to be treated.

The cylindrical bio-reactor container of the present invention is immersed directly into a waste-laden environment to be treated. In many instances, such wastes are contained within aqueous solutions in wells, sumps or other enclosures situated below the earth's surface. As such, in the preferred embodiment, the cylindrical bio-reactor container of the present invention is provided with brackets or rings which extend from the external surface of said cylindrical bio-reactor container. Cables, rods or the like can be attached to said brackets or rings in order to suspend or hang the bio-reactor container within subterranean enclosures such as sewer wet-wells, and the like. Although it is possible that said cylindrical bio-reactor container can extend across the air/liquid interface in the wet-well or other enclosure, such positioning is not required.

Prior to being inserted into an environment to be treated, a microbially inoculated biocarrier medium (or media) is loaded within the inner bore of the cylindrical bio-reactor container. Any number of different biocarrier media can be used for this purpose. In the preferred embodiment, such microbially inoculated biocarrier is one or more granular ceramic media, such as are currently commercially available. Ideally, the biocarrier media provides high surface area for microbial growth, while having exterior dimensions sufficient to prevent such biocarrier media from passing through the apertures in the bio-reactor container. Said biocarrier media is ideally inoculated with microbial culture (s) specific to the degradation of waste(s) to be encountered and treated within a particular environment.

In the preferred embodiment of the present invention, such microbially inoculated biocarrier media is loaded within the inner bore of said roughly cylindrical bio-reactor container via an opening at the upper end thereof. Once the bio-reactor container is sufficiently loaded with inoculated biocarrier media, the cap is installed on the top of said bio-reactor container. It should be noted that such biocarrier is ideally loaded within the inner bore of said cylindrical bio-reactor so that it covers or engulfs the upwardly extending terminus of said conduit.

Air and nutrient sources are supplied to the microbial population(s) which are located on the biocarrier media. Although such air and nutrient sources can be placed in any number of different locations relative to said cylindrical bio-reactor container, in the preferred embodiment of the present invention such air and nutrient sources are placed at a remote location. For example, in applications in which the cylindrical bio-reactor container is installed within a well or similar subterranean enclosure, such air and nutrient sources are beneficially provided at the earth's surface and at or near the uppermost opening to such well or other enclosure. Tubing or other similar lines are used to carry air and/or nutrients from such air and nutrient sources directly to the conduit extending to said bio-reactor container. While the nutrients provided by said nutrient source(s) should be beneficially tailored to the specific microbial agents being used, in the preferred embodiment such nutrients are typically some combination of nitrates and/or phosphates.

Air provided through the conduit and into the cylindrical bio-reactor container serves to oxygenate beneficial microbial cultures contained therein. Such oxygenation permits increased respiration and population expansion of such microbes. Ultimately, such oxygenation allows the desired microbial cultures to thrive, thereby resulting in optimized mineralization of waste products within the environment being treated. Moreover, air bubbles generated by allowing air to diffuse through the microbially inoculated biocarrier and the waste-laden liquid environment facilitates microbial bleed-off from the bio-reactor container to the surrounding environment.

Thus, the present invention provides continuous in-situ addition of beneficial microbes directly within an environment to be treated. Such continuous microbial addition results in demand growth, thereby permitting optimized mineralization of wastes being treated as well as acclimation of the microbes to such waste. Over time, such beneficial microbes will establish themselves as the dominant species within a particular environment being treated. Eventually, such microbes will colonize walls and other surfaces of structures housing the wastes being treated. Such colonization will provide favorable conditions for further expansion of beneficial microbial agents through the waste-laden environment being treated.

In the specific context of sewer and water treatment systems, the present invention can significantly increase the overall capacity of water treatment plants, thereby reducing the need for costly and time-consuming facility expansion. Over time, the in-situ microbial addition provided by the present invention results in the spread of beneficial microbial agents throughout sewer wet-wells, basins and associated piping. Because the beneficial microbial agents which are continuously generated by the present invention became the dominant species throughout the system in question, much of the wastes in such system are mineralized prior to reaching a water treatment plant. Accordingly, water is much cleaner when it ultimately reaches its destination at a water treatment facility, thereby resulting in improved efficiency at such facility.

DESCRIPTION OF THE PREFERRED EMBODIMENT(S)

Figure 1:
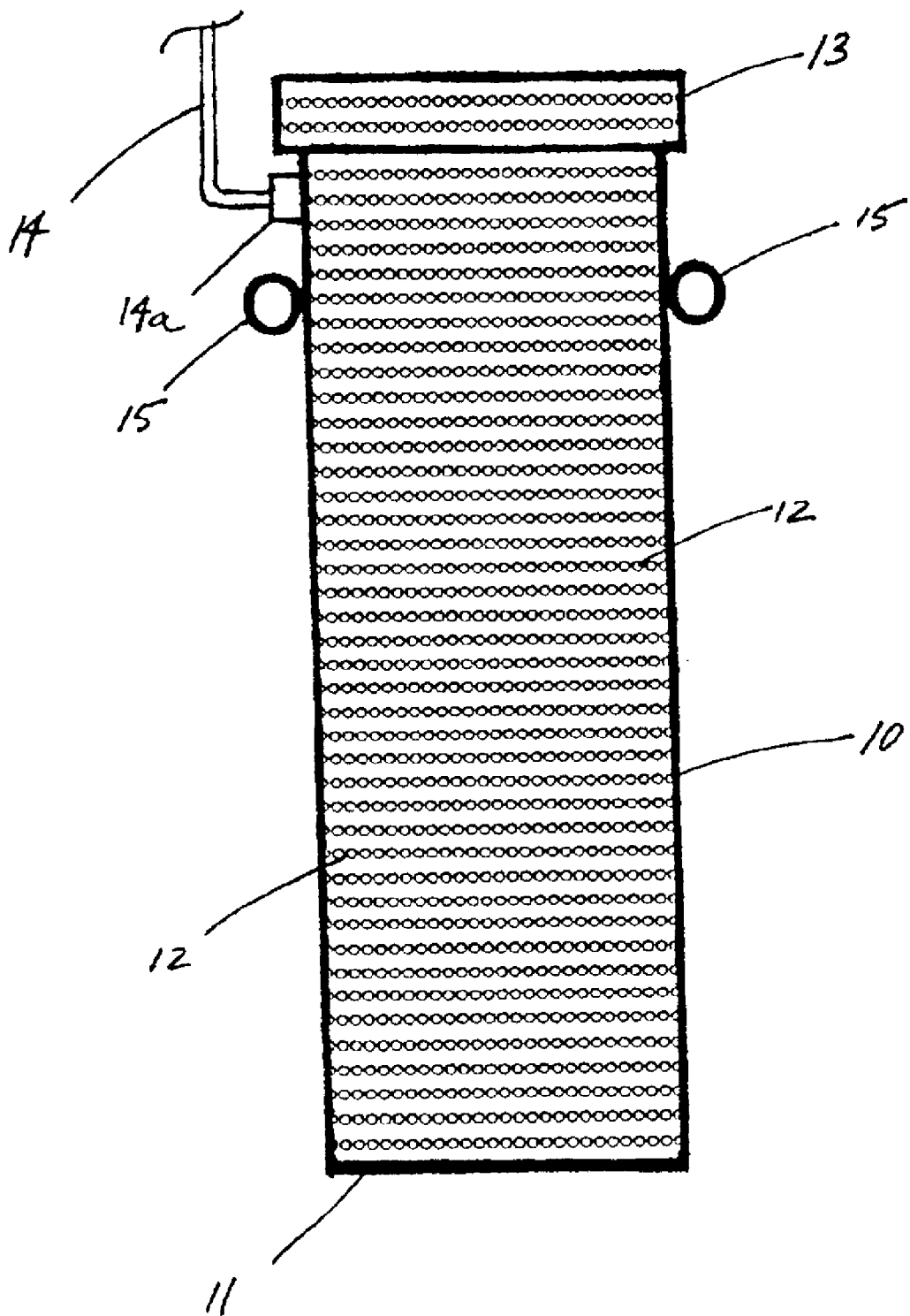
FIG. 1 depicts a side view of an in-situ bio-reactor container of the present invention.

Referring to the drawings, FIG. 1 depicts an immersible bio-reactor container 10 of the present invention. Although said bio-reactor can be any number of different shapes or sizes, in the preferred embodiment said immersible bio-reactor 10 is a roughly cylindrical, hollow container having base 11. Said bio-reactor contains one or more openings which permit communication between the internal and external surfaces of said bio-reactor. In the preferred embodiment, said openings are in the form of a plurality of apertures 12 extending through the walls of said hollow, cylindrical bio-reactor container 10. Alternatively, the walls of said bio-reactor container can be formed of mesh or other permeable material. Additionally, a removable cap 13 is provided to enclose the opening at the upper extent of said cylindrical bio-reactor container 10.

Conduit 14 extends to said hollow cylindrical bio-reactor container 10, terminating in a bulkhead fitting 14a. In the preferred embodiment, said conduit 14 is constructed of spool-able, inert tubing. However, many different types of tubing or piping for such conduit is commercially available in varying rigidity, diameters and lengths. An extension of conduit 14 connects at bulkhead fitting 14a and extends within the inner bore or chamber of hollow cylindrical bio-reactor container 10.

Cylindrical bio-reactor container 10 of the present invention is immersed directly into a waste-laden environment to be treated, such as a sewer wet-well, sump or other enclosure below the earth's surface. In such cases, it is beneficial to suspend said cylindrical bio-reactor container 10 directly within the waste supporting liquid environment to be treated. As such, in the preferred embodiment, cylindrical bio-reactor container 10 of the present invention is provided with brackets 15 which extend from the outer surface of said cylindrical bio-reactor container 10. Cables, rods or the like can be attached to said brackets 15 in order to suspend or hang cylindrical bio-reactor container 10 within waste supporting liquid in a subterranean enclosure such as a sewer wet-well, or the like.

Figure 2:
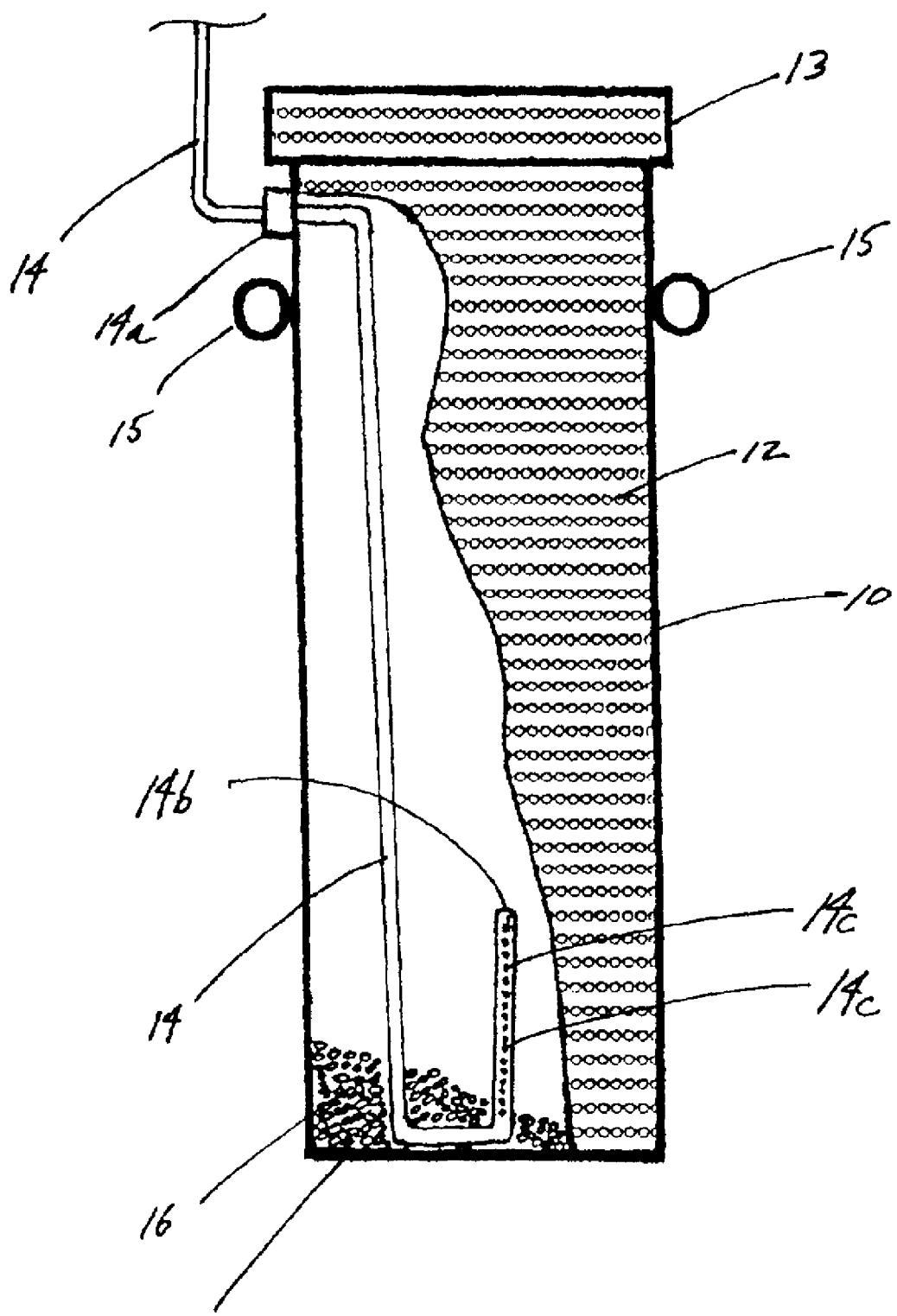
FIG. 2 depicts a side partial cut-away view of an in-situ bio-reactor container of the present invention.

FIG. 2 depicts a partial cut-away view of cylindrical bio-reactor container 10 of the present invention. Within the inner bore or chamber of cylindrical bio-reactor container 10, conduit 14 extends from bulkhead fitting 14a to base 11 of cylindrical bio-reactor container 10. Said conduit 14 extends for a distance along the base of said cylindrical bio-reactor container 10, and thereafter turns upward in a direction which is substantially parallel to longitudinal axis of cylindrical bio-reactor container 10. Conduit 14 ends in terminus 14b. One or more apertures 14c extend through conduit 14 at or near terminus 14b thereof. Alternatively, an air diffuser can be installed at or near conduit terminus 14b.

Still referring to FIG. 2, microbially inoculated biocarrier media 16 is loaded within the inner bore of the cylindrical bio-reactor 10. Any number of different biocarrier media can be used for this purpose. In the preferred embodiment, microbially inoculated biocarrier media 16 is one or more varieties of commercially available ceramic media providing significant surface area for microbial growth. Such biocarrier 20 media 16 must have sufficient outer dimensions to prevent loss or passage of such biocarrier media 16 through apertures 11 of cylindrical bio-reactor container 10. Prior to being loaded within cylindrical bio-reactor container 10, said biocarrier media 16 is inoculated with one or more microbial population(s) specific to the degradation of waste(s) to be encountered and treated within a particular environment.

In the preferred embodiment of the present invention, microbially inoculated biocarrier media 16 is loaded within the inner bore of cylindrical bio-reactor container 10 via removable cap 13. Once cylindrical bio-reactor container 10 is sufficiently loaded with biocarrier media 16, removable cap 13 is installed on the top of said cylindrical bio-reactor container 10. It should be noted that, in the preferred embodiment, biocarrier media 16 is ideally loaded within cylindrical bio-reactor container 10 so that it substantially fills the inner bore thereof. At a minimum, enough inoculated biocarrier media 16 should be loaded within the inner bore of cylindrical bio-reactor container 10 so that the upwardly extending terminus 14b of conduit 14 is completely covered with such inoculated biocarrier media 16.

Figure 3:
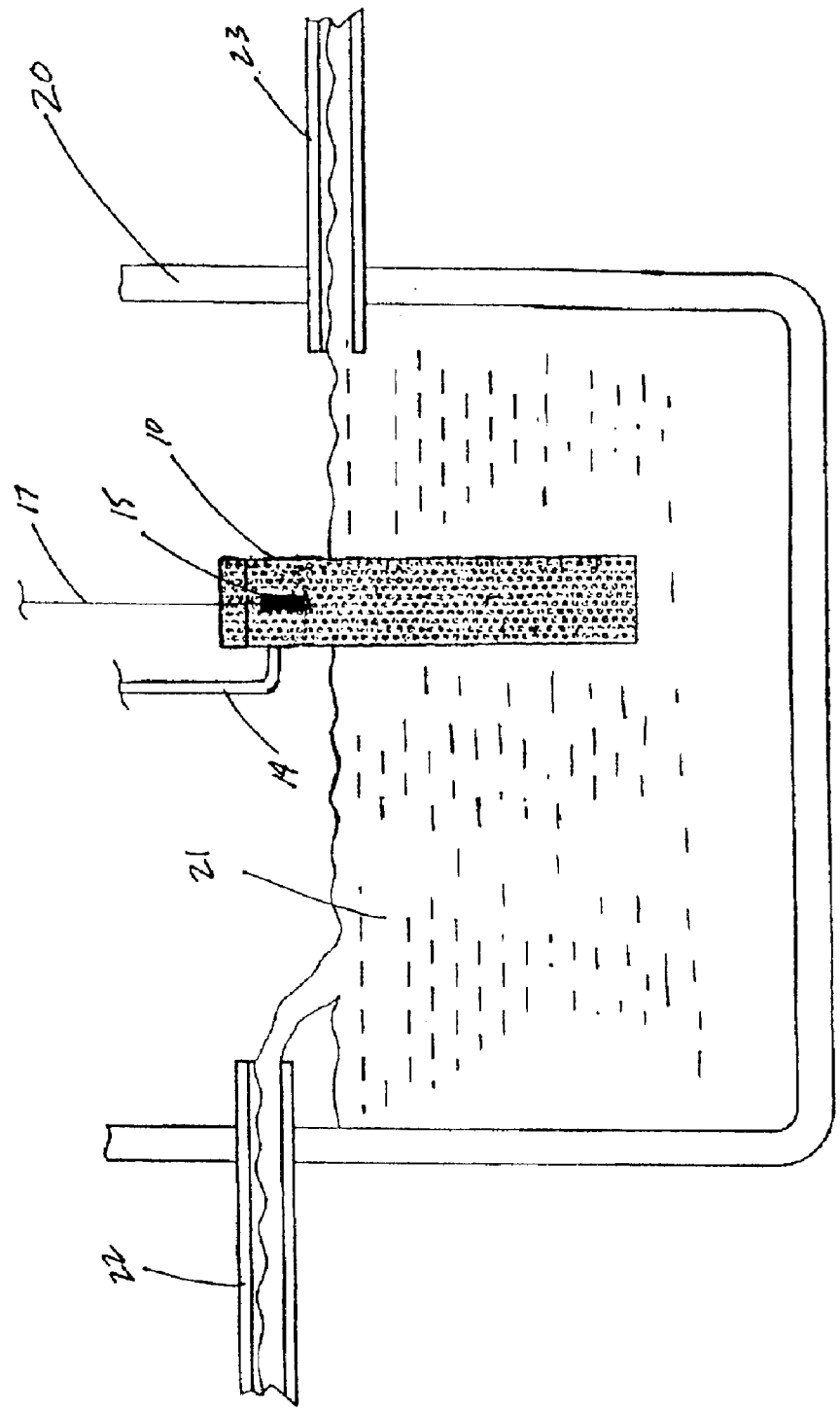
FIG. 3 depicts a side view of components of the present invention installed within a waste-laden environment to be treated.

FIG. 3 depicts the cylindrical bio-reactor container 10 of the present invention installed within a sewer wet-well 20. Waste supporting liquid 21 is received within sewer wet-well 20 via inlet pipe 22. Conversely, waste supporting liquid 21 flows out of sewer wet-well 20 via outlet pipe 23. Waste supporting liquid 21 contains organic matter and other wastes.

Still referring to FIG. 3, cylindrical bio-reactor container 10 is suspended within sewer wet-well 20. Such cylindrical bio-reactor container 10 is at least partially immersed within waste supporting liquid 21. Although many different means of suspending cylindrical bio-reactor container 10 can be envisioned, in the preferred embodiment said cylindrical bio-reactor container 10 is hung within sewer wet-well 20. One end of cable 17 is affixed to bracket 15 on the external surface of cylindrical bio-reactor container 10, while the other end of cable 17 is anchored or secured at or near the uppermost opening of said sewer wet-well 20 at the earth's surface. Conduit 14 also extends from the external surface of said cylindrical bio-reactor container 10 upward to the uppermost opening of said sewer wet-well 20 at the earth's surface.

Figure 4:
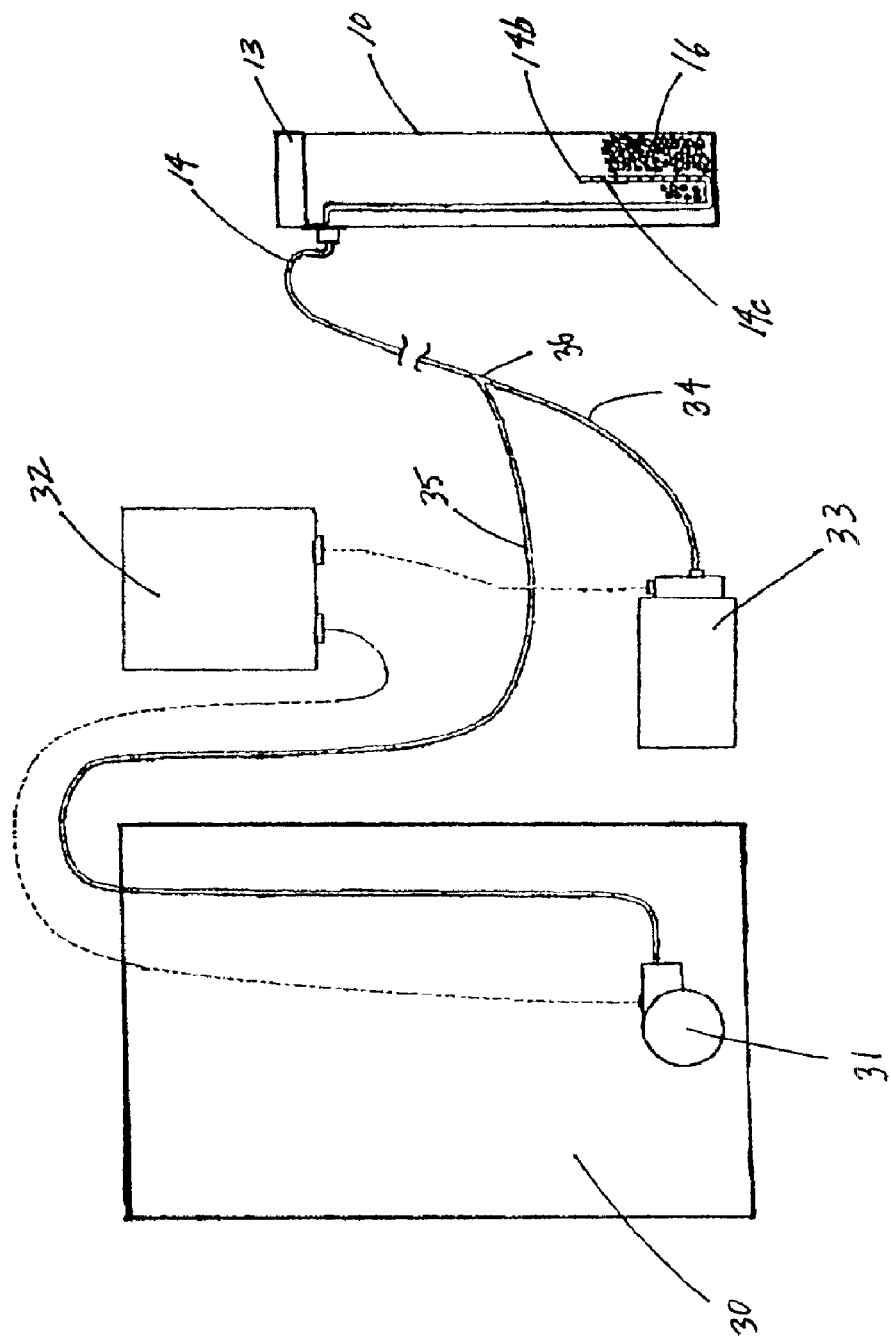
FIG. 4 depicts a systemic view of the components of the present invention.

FIG. 4 depicts a systemic view of the preferred embodiment of the present invention. Tank 30 contains desired nutrients, ideally tailored to the microbial population(s) inoculated on biocarrier media 16. The amount and type of such nutrients are selected based on the microbial populations utilized in a particular application. Submersible pump 31 is installed within tank 30 and is powered by electrical source 32. Similarly, air compressor 33 is also powered by electrical source 32. Although submersible pump 31 and air compressor 33 can operate continuously, in many applications it is preferable to utilize a timer to provide for selective and/or periodic operation.

Cylindrical bio-reactor container 10 is also provided. Within the inner bore or chamber of cylindrical bio-reactor container 10, conduit 14 extends from the upper portion of cylindrical bio-reactor container 10 to base 11 of said cylindrical bio-reactor container 10. Said conduit 14 extends for a distance along base 11 of said cylindrical bio-reactor container 10, and thereafter turns upward in a direction which is substantially parallel to longitudinal axis of cylindrical bio-reactor container 10. Conduit 14 ends in terminus 14b. One or more apertures or other openings 14c extend through conduit 14 at or near terminus 14b thereof. Microbially inoculated biocarrier media 16 is contained within the inner bore of cylindrical bio-reactor container 10. Although not shown as such in FIG. 4 for illustration purposes, granular biocarrier media 16 is ideally loaded within the inner bore of cylindrical bio-reactor container 10 so that it substantially fills the inner bore thereof.

Although nutrient tank 30 and air compressor 33 can be placed in any number of different locations relative to said cylindrical bio-reactor container 10, in the preferred embodiment of the present invention such air and nutrient sources are placed at a remote location. When cylindrical bio-reactor 10 is installed within a sewer wet-well or similar subterranean enclosure, such air and nutrient sources are conveniently situated at the earth's surface at or near the uppermost opening to such well or other enclosure. Tubing 34 is used to transport air from air compressor 33 to conduit 14 extending to said cylindrical bio-reactor container 10. Similarly, tubing 35 is used to transport nutrients from nutrient tank 30 to said cylindrical bio-reactor container 10. In the preferred embodiment, tubing 34 and 35 meet at junction point 36 before tying into conduit 14.

Air from air compressor 33 which is provided through line 34, conduit 14 and into cylindrical bio-reactor container 10 exits through apertures 14c and diffuses through biocarrier media 16, thereby serving to oxygenate the beneficial microbial population(s) inoculated thereon. Such oxygenation permits increased respiration and population expansion of such beneficial microbial population(s). Ultimately, such oxygenation allows the desired microbial population(s) to thrive, thereby resulting in optimized mineralization of waste products within the environment being treated, sewer wet-well 20. Moreover, air bubbles generated by diffusing air through the microbially inoculated biocarrier media 16 facilitates microbial bleed-off from cylindrical bio-reactor cultures contained 10 and into the surrounding environment.

Referring to FIG. 3, the present invention provides continuous in-situ addition of beneficial microbes directly within environment 20 being treated. Such continuous microbial addition results in demand growth, thereby permitting optimized mineralization of wastes being treated as well as acclimation of the microbes to such waste. Over time, beneficial microbes will establish themselves as the dominant species within the environment being treated. Eventually, such beneficial microbes will colonize walls and other surfaces of sewer wet-well 20, inlet pipe 22 and outlet pipe 23. Such colonization will provide favorable conditions for further expansion of beneficial microbial agents through the overall system being treated.

While the invention has been described in connection with its preferred embodiment, it will be understood that many modifications will be apparent to those of ordinary skill in the art in light of the above disclosure. Such modifications may include using substitute materials, smaller or greater dimensions, varying the number and placement of biocarrier media, using a variety of different aeration devices, and so forth, to achieve substantially the same results in substantially the same way. Reference to the following claims should be made to determine the scope of the invention.

What is claimed is:

1. A method of treating waste supported in a liquid comprising:
 a. Inoculating at least one carrier medium with at least one microbial population;
 b. Placing said at least one inoculated carrier medium within a porous container;

c. Immersing said porous container in said waste supporting liquid;
d. Supplying oxygen to said porous container and said at least one microbial population; and
e. Propagating said at least one microbial population on the surface of said at least one carrier medium.

2. The method of claim 1, further comprising the step of supplying at least one nutrient to said at least one microbial populations.

3. The method of claim 1, further comprising the step of spreading said at least one microbial populations throughout said waste supporting liquid.

4. The method of claim 3, wherein said at least one microbial populations is spread throughout said waste supporting liquid by gas bubbles diffusing through said liquid.

5. A method of treating waste in a sewer wet-well comprising:
a. Inoculating at feast one carrier medium with at least one microbial population;
b. Placing said at least one inoculated carrier medium within a porous container;
c. Installing said porous container in said sewer wet-well;
d. Supplying oxygen to said porous container and said at least one microbial population; and
e. Propagating said at least one microbial population on the surface of said at least one carrier medium.

6. The method of claim 5, further comprising the step of supplying at least one nutrient to said at least one microbial populations.

7. The method of claim 5, further comprising the step of spreading said at least one microbial populations throughout said sewer wet-well.

8. The method of claim 7, wherein said at least one microbial population is spread throughout said wet-well by gas bubbles diffusing through said sewer wet-well.

9. A method of treating waste supported in a liquid comprising:
a. Inoculating at least one carrier medium with at least one microbial population;
b. Placing said at least one inoculated carrier medium within a porous container;
c. Immersing said porous container in said waste supporting liquid;
d. Supplying oxygen to said porous container and said at least one microbial population; and
e. Propagating said at least one microbial population on the surface of said at least one carrier medium while said porous container is immersed in said waste supporting liquid.

10. The method of claim 9, further comprising the step of supplying at least one nutrient to said at least one microbial population.

11. The method of claim 9, wherein said oxygen is supplied via a conduit having a diffuser situated within said porous container.

12. The method of claim 9, further comprising the step of spreading said at least one microbial population throughout said waste supporting liquid.

13. The method of claim 12, wherein said at least one microbial population is spread throughout said waste supporting liquid by gas bubbles diffusing through said liquid.

14. The method of claim 13, wherein said gas is air.

* * * * *